(12) United States Patent
Letourneau

(10) Patent No.: US 10,097,280 B2
(45) Date of Patent: Oct. 9, 2018

(54) SYSTEMS AND METHODS FOR COMMUNICATION USING SPARSITY BASED PRE-COMPENSATION

(71) Applicant: Reservoir Labs, Inc., New York, NY (US)

(72) Inventor: Pierre-David Letourneau, Long Island, NY (US)

(73) Assignee: Significs & Elements, LLC, New York, NY (US)

( * ) Notice: Subject to any disclaimer, the term of this patent is extended or adjusted under 35 U.S.C. 154(b) by 0 days.

(21) Appl. No.: 15/283,781

(22) Filed: Oct. 3, 2016

(65) Prior Publication Data

US 2017/0099113 A1 Apr. 6, 2017

Related U.S. Application Data

(60) Provisional application No. 62/236,537, filed on Oct. 2, 2015.

(51) Int. Cl.
*H04B 10/00* (2013.01)
*H04B 10/69* (2013.01)
*H04B 10/2507* (2013.01)

(52) U.S. Cl.
CPC ....... *H04B 10/697* (2013.01); *H04B 10/2507* (2013.01)

(58) Field of Classification Search
CPC .......... H04B 10/2507; H04B 10/25137; H04B 10/0793; H04B 10/0795; H04B 10/07953; H04B 10/697; H04B 10/25253; H04B 10/58

USPC ....... 398/183, 192, 193, 194, 195, 196, 197, 398/198, 199, 33, 38, 158, 159, 25, 26, (Continued)

(56) References Cited

U.S. PATENT DOCUMENTS

| | | | | |
|---|---|---|---|---|
| 2009/0196630 A1* | 8/2009 | Ishaug | ................ | H04B 10/504 398/193 |
| 2010/0046958 A1* | 2/2010 | Awadalla | ......... | H04B 10/25137 398/149 |

OTHER PUBLICATIONS

Maiti, Deepyaman. et al. "Modified Nonlinear Decision Feedback Equalizer for Long-Haul Fiber-Optic Communications". Journal of Lightwave Technology, vol. 33, No. 18, Sep. 15, 2015. 10 pages.

(Continued)

*Primary Examiner* — Hanh Phan
(74) *Attorney, Agent, or Firm* — Goodwin Procter LLP

(57) ABSTRACT

A signal pre-compensation system analyzes one or more properties of a communication medium and, taking advantage of the locality of propagation, generates using sparse fast Fourier transform (sFFT) a sparse kernel based on the medium properties. The system models propagation of data signals through the medium as a fixed-point iteration based on the sparse kernel, and determines initial amplitudes for the data symbol(s) to be transmitted using different communication medium modes. Fixed-point iterations are performed using the sparse kernel to iteratively update the initial amplitudes. If the iterations converge, a subset of the finally updated amplitudes is used as launch amplitudes for the data symbol(s). The data symbol(s) can be modulated using these launch amplitudes such that upon propagation of the pre-compensated data symbol(s) through the communication medium, they would resemble the original data symbols at a receiver, despite any distortion and/or cross-mode interference in the communication medium.

20 Claims, 2 Drawing Sheets

(58) Field of Classification Search
USPC ......... 398/27, 28, 29, 141, 147, 81, 136, 79, 398/208, 202
See application file for complete search history.

(56) References Cited

OTHER PUBLICATIONS

Sinkin, Oleg V. et al. "Optimization of the Split-Step Fourier Method in Modeling Optical-Fiber Communications Systems". Journal of Lightwave Techonology, vol. 21, No. 1, Jan. 2003. 8 Pages.

Taha, Thiab et al. "Analytical and Numerical Aspects of Certain Nonlinear Evolution Equations. II. Numerical, Nonlinear Scrödinger Equation". Journal of Computational Physics. vol. 55, No. 2, Aug. 1984. 28 Pages.

Temprana, E. et al. "Overcoming Kerr-induced capacity limit in optical fiber transmission." Science. vol. 348. Issue 6242. Jun. 26, 2015. 5 Pages.

\* cited by examiner

SYSTEMS AND METHODS FOR COMMUNICATION USING SPARSITY BASED PRE-COMPENSATION

CROSS-REFERENCE TO RELATED PATENT APPLICATIONS

This application claims benefit of priority to U.S. Provisional Patent Application Ser. No. 62/236,537 entitled "Systems and Methods for Communication," filed on Oct. 2, 2015, the contents of which are incorporated herein by reference in their entirety.

FIELD OF THE INVENTION

This disclosure generally relates to techniques for achieving data communication via distortive communication media and, in particular, to pre-compensation techniques that can mitigate or even nullify the effect of the distortion.

BACKGROUND

Communication media that are distortive, such as an optical fiber, are often used in high-speed data communication. In some cases, the distortion introduced by the communication medium is nonlinear. In order to achieve a high data rate or a high bandwidth, multi-mode communication is often employed in which different data signals are simultaneously transmitted via different channels, also called modes, of the communication medium. The carrier frequencies used for different modes are typically different.

One important physical phenomenon currently limiting the information capacity of optical fibers over long distances when multi-mode communication is employed has been identified as the nonlinear interactions between different frequency modes, or cross talk across two or more channels. When multiple signals with initial profiles $\{A_i(0, t)\}_{i=1}^{l}$ where l is the total number of modes are sent over multiple channels of a medium, those signals generally interact with each other over long distances due to the presence of weak nonlinearities, and distort the signal(s) in one or more other channels. This produces distorted signals $\{A_i(L, t)\}_{i=1}^{l}$ at the receiver which can bear little resemblance to the original transmitted signals, and this impedes their appropriate decoding at the receiver.

According to one technique commonly employed to reduce the effect of crosstalk, the power of the data signals when they are launched into the communication medium is reduced, so that the effect of crosstalk may be reduced. The low-power or low strength signals generally do not propagate effectively over a long distance, however. Long in this context can be a few hundreds of meters, a few kilometers, tens, hundreds, or thousands of kilometers, etc. Therefore, in order to transmit the signals over long distances several relays (also called repeaters) are generally needed. The relays may be provided every few hundreds of meters or a few kilometers, or tens or hundreds of kilometers, so that any nonlinear effects can minimized between the relay stations, reducing signal distortion at the final receiver. Relay stations can be expensive and generally increase the cost and complexity of the communication system.

Nonetheless, it has been demonstrated recently that the combination of highly-correlated co-polarized frequency modes with a signal pre-compensation step can significantly reduce the need for such expensive and inefficient relay stations. Such pre-compensation involves finding appropriate initial profiles such that the signal reaching the receiver has the desired form despite the presence of nonlinearities in the dispersive communication medium. In general, in the computations performed to achieve pre-compensation, the Nonlinear Schrodinger Equation (NLSE) modeling the communication medium is solved numerically.

For example, one benchmark, the split-symmetric method, is a time-stepping method that can be written as follows:

$$u(z,t+\delta t) = \mathcal{F}^{-1}[e^{-i\delta t k^2} \mathcal{F}[e^{i\delta t N(u(z,t))} u(z,t)]]$$

where u(z, t) is a time-harmonic solution to the nonlinear Schrödinger equation with wave number k, and $\mathcal{F}$ is the Fourier transform. A deeper look at the equation above shows that if $N_z^{SS}$ and $N_t^{SS}$ points are respectively used in evaluating the z and t variables, representing the propagation distance and propagation time, respectively, and if the fast Fourier transform (FFT) is used, the final cost of the computations is:

$$O(N_t^{SS} N_z^{SS} \log(N_z^{SS}))$$

For typical communication systems, this often leads to large problems involving hundreds of millions of unknowns, and such problems cannot be solved fast enough to provide real-time pre-compensation. We note that some efforts have been made recently towards reducing the complexity of solving the NLSE and computing pre-compensated signals. However, these proposed methods are either based upon heuristics, or they are lower-order methods, where accuracy of the solution can be increased by decreasing the step size, which can disproportionately increase the computation time. Just as in the case of the split-symmetric method, this can significantly increase the number of unknowns required to reach an acceptable level of accuracy. As such, various known techniques do not provide a numerical solution fast enough, e.g., within a few seconds, a few milliseconds, or in even less time, for real-time pre-compensation of signals to be transmitted via a communication medium.

SUMMARY

In various embodiments, a computational model referred to as Fast Inversion for the Nonlinear Schrödinger Equation (FINSE) can facilitate pre-compensation of signals to be transmitted via a communication medium in real time (e.g., in less than a few seconds, a few milliseconds, a few microseconds, or even within a fraction of a microsecond). The pre-compensated signals can be transmitted at high power because the pre-compensation can mitigate or nullify the adverse effect of crosstalk. As such, the pre-compensated signals can be transmitted without needing a repeater over long distances (e.g., a few hundred meters, a few kilometers, or tens, hundreds, or even a few thousand kilometers).

Various FINSE embodiments can achieve increased speed compared to conventional techniques for computing the numerical solution of the NLSE under appropriate boundary conditions, and over some finite domain $(z, t) \in [0, L] \times [0, T]$. Here L is the total propagation distance (e.g., a few hundred meters, a few kilometers, or tens, hundreds, or even a few thousand kilometers) and T is the total time of propagation. In general, T=L/c, where c is the speed of light. As discussed below, if $N_z$ and $N_t$ points are used to discretized the problem of solving the NLSE in the z and t variables respectively, where z represents the propagation distance of a discretized point from the origin, i.e., the launch location, and t presents the time of propagation up to that discretized point from the launch time (e.g., t=0), then FINSE requires $$O(N_t \log(\varepsilon))$$

floating-point operations (flops) to reach a solution with accuracy of ε, in addition to a pre-computation step having cost of at most $O(N_z \log(N_t))$, in some cases.

Furthermore, the number of discrete time instances $N_t^{SS}$ associated with the split-symmetrical method is typically much larger than the number $N_t$ associated with various embodiments described herein. This is because our technique only requires two points per wavelength $$\lambda = \frac{2\pi}{k},$$

whereas the split-symmetric method is at best an order-3 method and thus requires many more points per wavelength.

Overall, our method is, $$\sim \frac{N_t^{SS} N_z^{SS} \log(N_z^{SS})}{N_t \log(\epsilon)}$$

times faster than the split-symmetric method. For problems of interest, involving hundreds of thousands of unknowns in each dimension (typically, distance, time, and number of different frequencies corresponding to different modes), our technique can provide a speed up of up to hundreds of thousands of times, or even more, and thus can render pre-compensation problems that currently-unsolvable in real time, well within reach. Unlike some other techniques that may trade off computation accuracy and speed, various embodiments described herein, besides having better asymptotic scaling, can provide solutions within a specified accuracy for bandlimited signals with sampling at or beyond the Nyquist rate.

Accordingly, in one aspect, a method is provided for facilitating pre-compensation of one or more data signals to be transmitted via communication medium. Typically, the duration of the data symbol is much smaller (e.g., on the order of micro, nano, or picoseconds, or even less) that the total travel time from the source to receiver (e.g., a few seconds, milliseconds, microseconds, etc.). The method includes receiving a data symbol corresponding to a transmission mode, typically denoted l, of the communication medium. The data symbol is represented at least in part by an original amplitude, typically denoted a. The method also includes determining e.g., by solving a non-linear Schrödinger equation (NLSE), a set of pre-compensated launch amplitudes for the data symbol. The set of launch amplitudes for a data symbol corresponding to a mode l may be denoted $\vec{A}_l(0, t)$). The set of pre-compensated launch amplitudes is based on, at least in part, the original amplitude of the data symbol (i.e., $a_l$), and one or more nonlinear properties of the communication medium.

Determination of the set of pre-compensated launch amplitudes includes computing using a sparse fast Fourier transform (sFFT) a sparse kernel having a set of values based on the one or more nonlinear properties of the communication medium. Each value of the sparse kernel corresponds to a respective unique pair of distance and propagation time values, usually denoted (z, t) along a selected distance, usually denoted L, of the communication medium. The pre-compensated data symbol may travel the selected distance without needing a repeater, and the distortion introduced by the communication medium during this propagation is likely compensated, at least in part, by the pre-compensation, so that the data symbol received at the receiver would likely resemble the original data symbol, prior to the pre-compensation thereof.

As such, determination of the set of pre-compensated launch amplitudes also includes representing propagation of the data symbol through the communication medium over the specified distance as a fixed-point iterative computation based on: (i) the sparse kernel, and (ii) a set of amplitudes, typically denoted $\vec{A}_l(z, t)$, where each amplitude in the set corresponds to a respective unique pair of distance and propagation time values, usually denoted (z, t). In addition, the determination of the set of pre-compensated launch amplitudes includes determining based on the original amplitude an initial value for each amplitude in the set of amplitudes (typically denoted $\vec{A}_l^{(0)}(z, t)$), and iterating the fix-point iterative computation until an earlier of: (i) convergence of the iterative computation, and (i) performance of a maximum permissible number of iterations. In each iteration, the values of amplitudes in the set of amplitudes from a previous iteration are updated. As such, a (k+1)-th iteration can be represented as; $\vec{A}_l^{(k+1)}(z, t) = \vec{\psi}(\vec{A}_l^{(k)}(z, t))$. If the convergence is achieved, determination of the set of pre-compensated launch amplitudes includes designating a subset of the updated amplitude values corresponding to distance value of zero the set of pre-compensated launch amplitudes, and otherwise reporting pre-compensation failure.

In some embodiments, the communication medium includes a multi-mode communication medium having several of transmission modes. Each transmission mode may be associated with a respective transmission frequency or a carrier frequency used for modulating data symbols transmitted using that mode. The receiving step may include receiving a data symbol corresponding to each transmission mode, and the determining step may include determining a set of pre-compensated launch amplitudes (typically denoted $\vec{A}_l(0, t)$) for each data symbol. The communication medium may include an optical fiber. A nonlinear property of the communication medium can be an attenuation coefficient, a group velocity, or a dispersion coefficient of first, second, or higher orders.

In some embodiments, determining an initial value for each amplitude in the set of amplitudes includes solving a signal propagation model of the communication medium by setting at least one nonlinear property of the communication medium in the model to zero. The sparsity of the sparse kernel may be proportional to a total number of propagation time values, typically denoted $N_1$. Iterating the fix-point iterative computation may include applying a projection, which can be linear, and the projection operation may include updating the value of one or more amplitudes in the set of amplitudes according to a boundary condition. In some embodiments, the selected distance is within a range from 1 km up to 1,000 km, and the number of distance and propagation time values can be within a range from $10^8$ up to $10^{13}$.

In some embodiments, the method further includes transmitting via the communication medium a signal based on the set of pre-compensated launch amplitudes. Such a signal may be called a pre-compensated or a pre-distorted signal. In some embodiments, when a pre-compensation failure is reported, determining the set of pre-compensated launch amplitudes further include decreasing the selected distance (e.g., L), and repeating the step of determining the set of pre-compensated launch amplitudes using the decreased distance. In some cases, the total distance (L) between the transmitter and receiver, i.e., the length of the communication medium, is split into two or more legs, and each leg is analyzed sequentially, as described herein.

In another aspect, a system is provided for facilitating pre-compensation of one or more data signals to be transmitted via communication medium. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: receive a data symbol corresponding to a transmission mode of the communication medium. The data symbol is represented at least in part by an original amplitude. The instructions also program the processing unit to determine a set of pre-compensated launch amplitudes for the data symbol. The set of pre-compensated launch amplitudes is based on, at least in part, the original amplitude of the data symbol, and one or more nonlinear properties of the communication medium.

To determine of the set of pre-compensated launch amplitudes, the instructions program the processing unit to compute using a sparse fast Fourier transform (sFFT) a sparse kernel having a set of values based on the one or more nonlinear properties of the communication medium. Each value of the sparse kernel corresponds to a respective unique pair of distance and propagation time values along a selected distance of the communication medium. To determine the set of pre-compensated launch amplitudes, the instructions further program the processing unit to representing propagation of the data symbol through the communication medium over the specified distance as a fixed-point iterative computation based on: (i) the sparse kernel, and (ii) a set of amplitudes, where each amplitude in the set corresponds to a respective unique pair of distance and propagation time values.

Moreover, for the determination of the set of pre-compensated launch amplitudes, the instructions program the processing unit to determine based on the original amplitude an initial value for each amplitude in the set of amplitudes, and to iterate the fix-point iterative computation until an earlier of: (i) convergence of the iterative computation, and (ii) performance of a maximum permissible number of iterations. The instructions program the processing unit to update, in each iteration, the values of amplitudes in the set of amplitudes from a previous iteration. The instructions also program the processing unit to designate, if the convergence is achieved, a subset of the updated amplitude values corresponding to distance value of zero as the set of pre-compensated launch amplitudes, and otherwise to report pre-compensation failure.

In various embodiments, the instructions can program the processing unit to perform one or more of the method steps described above. In some embodiments, the system includes a pre-compensator/modulator that modulates a received data symbol using the set of pre-compensated launch amplitudes, and transmits the modulated, i.e., pre-compensated or pre-distorted data symbol via the communication medium over the selected distance without needing a repeater.

In another aspect, an article of manufacture is provided that includes a non-transitory storage medium having stored therein instructions which, when executed by a processing unit program the processing unit, which is in electronic communication with a memory module, to facilitate pre-compensation of one or more data signals to be transmitted via communication medium. The instructions program the processing unit to: receive a data symbol corresponding to a transmission mode of the communication medium. The data symbol is represented at least in part by an original amplitude. The instructions also program the processing unit to determine a set of pre-compensated launch amplitudes for the data symbol. The set of pre-compensated launch amplitudes is based on, at least in part, the original amplitude of the data symbol, and one or more nonlinear properties of the communication medium.

To determine of the set of pre-compensated launch amplitudes, the instructions program the processing unit to compute using a sparse fast Fourier transform (sFFT) a sparse kernel having a set of values based on the one or more nonlinear properties of the communication medium. Each value of the sparse kernel corresponds to a respective unique pair of distance and propagation time values along a selected distance of the communication medium. To determine the set of pre-compensated launch amplitudes, the instructions further program the processing unit to representing propagation of the data symbol through the communication medium over the specified distance as a fixed-point iterative computation based on: (i) the sparse kernel, and (ii) a set of amplitudes, where each amplitude in the set corresponds to a respective unique pair of distance and propagation time values.

Moreover, for the determination of the set of pre-compensated launch amplitudes, the instructions program the processing unit to determine based on the original amplitude an initial value for each amplitude in the set of amplitudes, and to iterate the fix-point iterative computation until an earlier of: (i) convergence of the iterative computation, and (ii) performance of a maximum permissible number of iterations. The instructions program the processing unit to update, in each iteration, the values of amplitudes in the set of amplitudes from a previous iteration. The instructions also program the processing unit to designate, if the convergence is achieved, a subset of the updated amplitude values corresponding to distance value of zero as the set of pre-compensated launch amplitudes, and otherwise to report pre-compensation failure. In various embodiments, the instructions can program the processing unit to perform one or more of the method steps described above.

BRIEF DESCRIPTION OF THE DRAWINGS

In the following description, various embodiments of the present invention are described with reference to the following drawings, in which.

DETAILED DESCRIPTION

Figure 1:
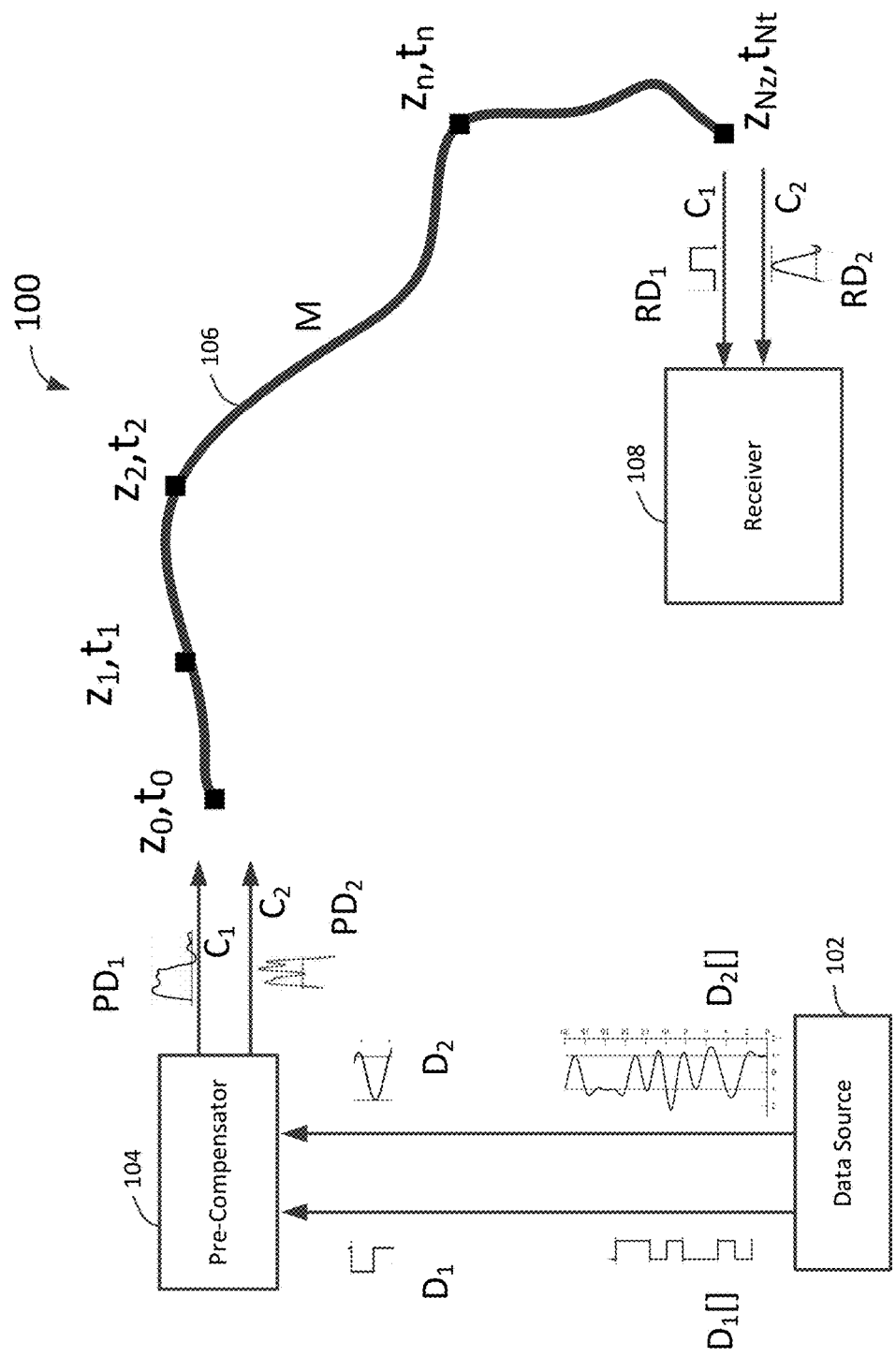
FIG. 1 schematically depicts a communication system employing various embodiments of a pre-compensation technique.

The pre-compensation step described earlier can be stated in mathematical terms as follows: find a solution to the NLSE:

$$\frac{\partial}{\partial z}A_l(z,t) + \frac{\alpha_l}{2}A_l(z,t) + \frac{1}{v_{gl}}\frac{\partial}{\partial t}A_l(z,t) + \qquad (1)$$

-continued $$\frac{i}{2}\beta_{2l}\frac{\partial^2}{\partial t^2}A_l(z,t) - \beta_{2l}\frac{1}{6}\frac{\partial^3}{\partial t^3}A_l(z,t) = N_l(\{A_l(z,\xi)\}),$$

subject to final conditions:

$$\{A_l(L,t) = A_l^P(t)\}_l. \quad (2)$$

Here, $$N_l(\{A_l(z,\xi)\}) = i\gamma\left(|A_l(z,t)|^2 + 2\sum_{m\neq l}|A_l(z,t)|^2\right)A_l(z,t),$$

is a nonlinear functional, $\{A_l\}$ represent the complex amplitudes of each mode (having carrier frequency $\omega_l$), $\alpha_l$ are mode attenuation coefficients, $v_{gl}/(\omega_l)$ are group velocities, $\beta_{2l}$, $\beta_{3l}$ are higher-order dispersions and $\gamma$ is the nonlinearity weight. Other dispersions of orders higher than three can also be considered.

In the Fourier domain, one can write, $$\left(\frac{\partial}{\partial z} + D_l(\omega)\right)\hat{A}_l(z,\omega) = \hat{N}(z,\omega) = \int e^{-i\omega t}N(\{A_l(z,t)\})dt \quad (3)$$

where $$D_l(\omega) = \frac{\alpha_l}{2} + \frac{i\omega}{v_{gl}} + \frac{i\omega^2}{2}\beta_{2l} + \frac{i\omega^3}{6}\beta_{3l}.$$

Now consider the fundamental solution/Green's function of the left-hand side linear operator, i.e., the function $\hat{g}_l(z,\omega)$ such that, $$\left(\frac{\partial}{\partial z} + D_l(\omega)\right)\hat{g}_l(z,\omega) = \delta(z)$$

We have the following lemma:
Lemma 1. For each fixed $\omega$, the fundamental solution to the equation above is given by $$\hat{g}_l(z,\omega) = e^{-D(\omega)z}H(z) + \hat{A}_l^h(z,\omega)$$

where $H(z)$ is a Heaviside function and $A_l^h(z,\omega)$ is a solution to the homogeneous version of the equation above. Therefore, through the Green's function and due to the translation invariance of the differential operator, Eq. (3) can be solved as:

$$\hat{A}_l(z,\omega) = \int e^{-D(\omega)(z-z')}H(z-z')\hat{N}_l(z',\omega)dz' + \hat{A}_l^h(z,\omega) \quad (4),$$

where $\hat{A}_l^h(z,\omega)$ is a solution to the homogeneous version of Eq. (3).

The homogeneous version of Eq.(3) is linear. Therefore, if $\hat{A}_l^h(z,\omega)$ is bandlimited, i.e., if $\hat{A}_l^h(z,\omega)=0$ for all $z\in\mathbb{R}$ and $|\omega|>W$, then the function $\hat{A}_l(z,\omega)$ such that $\hat{A}_l(z,\omega)=_0$ for all $z\in\mathbb{R}$ and $|\omega|>W$, is a solution to the inhomogeneous equation. In other words, if $\hat{A}_l^h(z,\omega)$ is bandlimited in time, so is $\hat{A}_l(z,\omega)$.

Taking the inverse Fourier transform of the previous equation in time on both sides gives, $$A_l(z,t) = \int\int\left(\int e^{i\omega(t-t')}e^{-D(\omega)(z-z')}H(z-z')d\omega\right)$$

$$N_l(\{A_l(z',t')\})dz'dt'$$

$$= \int\int K(z-z',t-t')N_l(\{A_l(z',t')\})dz'dt'$$

which in vector form is, $$\vec{A}(z,t) = \vec{\phi}(\vec{A}(z,t)). \quad (5)$$

Here, $\vec{\phi}(\cdot)$ is a nonlinear, vector-valued operator acting on $\vec{A}(z,t)$. In particular, this equation states that any solution to Eq. (1), must be a fixed point of the operator $\vec{\phi}(\cdot)$.

We next consider the boundary conditions. In the context of communication via a nonlinear dispersive medium, e.g., an optical fiber, we are interested in finding a set of initial amplitudes at the source $\{A_l^0(t) = A_l(0,t)\}_l$, such that the solution to the NLSE system satisfies final conditions at location L of the prescribed form of Eq. (2). Although we are interested in final boundary conditions in this case, the following methodology can apply just as well to the forward problem, i.e., if initial conditions are dictated and one seeks a forward solution to the NLSE.

To ensure that the boundary conditions are satisfied, we introduce the space of continuous function:

$$\mathcal{L}^2 := \{\vec{f}(z,t) : f \in L^2([0,L]\times[0,T]) \text{ and } \|\vec{f}(L,t) - \vec{A}^F(t)\| = 0\}$$

where the norm takes the form, $$\|\vec{f}(L,t)\| = \sum_l^\ell \|f_l(z,t)\|_2$$

In particular, this is a closed convex subspace of the product of Hilbert space $L^2([0, L]\times[0, T])$ We now characterize this space. Upon scaling, we can assume without loss of generality that we are working in the region $[0, 1]\times[0, 1]$. There we can write any function belonging to $L^2[0, 1]\times[0, 1]$ as:

$$f_l(z,t) = \sum_{n,m} f_{n,m}^{(l)} T_n(z) T_m(t) \quad (6)$$

where $\{T_n(z)\}_{n=0}^\infty$ forms a basis for $L^2[0, 1]$.

We assume that this is a basis of Chebyshev polynomials or complex exponentials, so that a fast discrete transform exists. At location z=L we have:

$$f_l(L,t) = \sum_{n,m} f_{n,m}^{(l)} T_n(L) T_m(t) = A_l^F(t)$$

which, due to orthogonality of the basis functions, implies that, $$\sum_n f_{n,m}^{(l)} T_n(L) = \int T_m(t) A_l^F(t) w(t) dt = \alpha_m^{(l)}, \forall\, m \in \mathbb{N} \quad (7)$$

w(t) being the weight function associated with the basis.

This imposes linear constraints on the coefficients $\{f_{n,m}^{(l)}\}$ and, as such, $f_l(z, t) \in L^2([0, 1] \times [0, 1])$ satisfies the boundary conditions if and only if the equation above is satisfied. Based on this observation, we consider a second linear operator, $$P: L^2([0,1] \times [0,1]) \to \mathcal{L}^2$$

defined in such a way that, $$\int T_n(z) T_m(t) P f_l(z, t) w(z) w(t) dz dt = \begin{cases} f_{0,m}^{(l)} = \alpha_m - \sum_{n>0} f_{n,m}^{(l)} T_n(z_F) & \text{if } n = 0 \\ f_{n,m}^{(l)} & \text{otherwise} \end{cases}$$

P is an projection of functions in $L^2([0, 1] \times [0, 1])$ onto the closed, convex subset $\mathcal{L}^2$. In particular, since the set is convex, the projection is well-defined (unique) and orthogonal. In some cases, P is a projection operator applied to the space $[0, L] \times [0, T]$. Therefore, any solution $\vec{A}^*(z, t)$ to Eq. (1) satisfying the boundary conditions (Eq. 2) must satisfy the fixed-point equation, $$\vec{A}^*(z,t) = P\vec{\phi}(\vec{A}^*(z,t)) + \vec{A}^h(z,t) = \vec{\psi}(\vec{A}^*(z,t)) \quad (8)$$

and vice-versa. That this fact can be used to devise an efficient numerical scheme is the consequence of the following lemma.

Lemma 2: Let $\vec{A}^*(z, t)$ be a fixed point of Eq. 5 where $\vec{A}^h(z, t)$ is bandlimited in time with bandwidth W, and satisfying boundary conditions 2. Consider $(z,t,\omega) \in [0, L] \times [0, T] \times [-W, W]$. Then, if $$\left\| \vec{A}^{(0)}(z, t) - \vec{A}^*(z, t) \right\| < 1$$

and, $$16 L T W^2 \gamma^2 l \left( 2 \sup_m \|A_m^*\| + 1 \right)^2 < 1$$

the fixed point iteration:

$$\vec{A}^{(k+1)}(z,t) = \vec{\psi}(\vec{A}^k(z,t)), \, k=0,1,2,\ldots$$

converges to the solution $\vec{A}^*(z, t)$ exponentially fast.

Lemma 2 indicates that if the initial guess $\vec{A}^{(0)}(z, t)$ is close enough to a solution, the fixed-point iteration will converge to that solution very rapidly. To obtain such first guess, FINSE use the solution of the homogeneous version (setting nonlinearities to zero) of Eq. (3), with boundary conditions: $A_l(L, t) = \vec{A}_l^F(t)$. This equation has a known analytic solution which can computed rapidly using standard techniques.

The explicit form of the constant in Lemma 2 is likely extremely coarse. In practice, the iteration should often converge even though the initial point is not as close as the Lemma dic-tates. If however, no sufficiently-close initial guess is available, i.e., if the iteration originally diverges, the domain can be split into two or more regions and the procedure can be applied to each sub-domain. For a small enough domain, i.e., the total distance over which the signal must travel through the communication medium without needing a repeater while still being recoverable at the receiver, the constant will usually be smaller than one.

As for the first guess, one can use the solution of the homogeneous version of Eq.(3) obtained by setting nonlinearities therein to zero, i.e.:

$$\frac{\partial}{\partial z} A_l,$$

$$(z, t) + \frac{\alpha_l}{2} A_l(z, t) + \frac{1}{v_{gl}} \frac{\partial}{\partial t} A_l(z, t) + \frac{i}{2} \beta_{2l} \frac{\partial^2}{\partial t^2} A_l(z, t) - \beta_{3l} \frac{1}{6} \frac{\partial^3}{\partial t^3} A_l(z, t) = 0$$

with boundary conditions: $A_l(L, t) = A_l^F(t)$, which is found to be (in the Fourier domain), $$\hat{A}_l^{(0)}(z, \omega) = e^{-D(\omega)z} \sum_{n=0}^{\infty} \left( \int T_n(\omega) \hat{A}_l^F(\omega) w(\omega) d\omega \right) T_n(\omega) \quad (9)$$

where $\{T_n(\omega)\}_n$ is an appropriate basis for $L^2[-W, W]$ as discussed before.

In order to render the iterative numerical solution computationally efficient, it is important to be able to apply the operator $P\phi(\bullet)$ in a fast manner. The operator P, upon expressing quantities in the proper basis, can be applied rapidly through the FFT. However, $\vec{\phi}(\bullet)$ has the form, $$\vec{\phi}(\vec{A}(z,t)) = \iint K(z-z', t-t') \vec{N}(\{\vec{A}(z',t')\}) dz' dt',$$

where the kernel $K(\bullet)$ is given by:

$$K(z-z',t-t') = H(z-z') \int e^{i\omega(t-t')} e^{-D(\omega)(z-z')} d\omega.$$

We note in passing that the problem of computing $K(z-z',t-t')$ is inherently ill-conditioned; a small difference is final conditions might give rise to a large difference in the solution due to damping. However, since we are merely interested in finding one particular set of initial conditions giving rise to the desired final conditions, this has no substantial impact on our final goal. Also, if the signal is amplified at regular intervals, the damping term $e^{-\alpha_l z}$ can be neglected.

In particular for a large family of parameters, it can be shown that $K(z-z',t-t')$ is inherently ill-localized in space-time, i.e., $$|K(z-z', t-t')| << 1 \, \forall \left| \frac{|z-z'|}{c} - |t-t'| \right| > p$$

for some fixed, positive p. This also agrees with physical intuition; were it not the case, the signal would not propagate. This makes the application of $\vec{\phi}(\bullet)$ computationally efficient; indeed, upon discretization the resulting matrix will be sparse. In particular, if $N_z$ and $N_t$ points are use in z and t respectively, the resulting matrix will have only $O(pN_t)$ nonzero entries and can therefore be applied cheaply in $O(pN_t)$ time. Therefore, since the fixed point iteration converges exponentially fast, the total cost of computing a pre-compensated signal with accuracy $\in$ is, $$O(N_t \log(\epsilon)).$$

On the other hand, computing the actual values of the kernel might be very expensive; if $N_z$, $N_t$ and $N_\omega$ points are use in z, t and $\omega$ respectively, then a naive implementation requires $O(N_z^2 N_t^2 N_\omega)$ operations which quickly becomes unmanageable. To alleviate this issue, we note that, $$\kappa(t-t', z-z') = \int e^{i\omega(t-t')} e^{-D(\omega)(z-z')} d\omega \quad (10)$$

is simply the Fourier transform of: $e^{-D(\omega)(z-z')}$ evaluated at (t−t').

Assuming that (z−z') and (t−t') can only take $N_z$ and $N_z$ values, respectively, Eq. (10) can be computed rapidly as follows:

1. Standard FFT: for each values of (z−z') compute FFT. Computation Cost: $O(N_z N_t \log(N_t))$.

2. Sparse FFT: for each values of (z−z') compute sFFT. Computation Cost: $O(N_z \rho \log(N_t))$.

This is a pre-computation step only. In this sense, it can be computed a priori and stored, and will have no effect on the cost of the iterative solution. Upon discretization of the integral and re-indexing, the resulting matrix (for component l) has entries:

$$K_{ij}^{(l)} = H(z_i - z'_j) \kappa(t_i - t'_j, z_i - z'_j)$$

As for the initial guess, it can also be pre-computed through Eq.(9) with the same complexity as the $\vec{\phi}(\cdot)$ pre-computation by performing the following steps: 1) Chebyshev transform or FFT, 2) application of diagonal operator $e^{-D(\omega)z}$ for each z, 3) Inverse Chebyshev transform or FFT. The Chebyshev transform and/or the FFT can be a sparse Chebyshev transform and sparse FFT, respectively.

Proof that $\mathcal{L}^2$ is a Closed Convex Subset of $\mathcal{L}^2([0, L] \times [0, T])$:

We first prove convexity. First, clearly $\mathcal{L} \subset \mathcal{L}^2([0, L] \times [0, T])$ which is a Hilbert space. Consider $f, g \in \mathcal{L}$. Clearly, for any $\alpha \in [0, 1]$ one has that, $$\alpha f(z, t) + (1 - \alpha) g(z, t) \in \mathcal{L}^2([0, L] \times [0, T])$$

and, $$\|(\alpha f(L, t) + (1 - \alpha)g(L, t)) - A^F(t)\| =$$
$$\|\alpha(f(L, t) - A^F(t)) + (1 - \alpha)(g(L, t) - A^F(t))\| \leq$$
$$\alpha \|f(L, t) - A^F(t)\| + (1 - \alpha)\|g(L, t) - A^F(t)\| = 0$$

demonstrating convexity.

As for closedness, first note that Eq.(6) is in fact an isometry. This implies in particular that given a sequence $f^{(t)}(z, t) \in \mathcal{L}^2$ converging to some function $f(z, t)$ in $\mathcal{L}^2([0, L] \times [0, T])$, the expansion coefficients appearing in Eq.(6) must be such that, $$\sum_{n,m} |f_{n,m}^{(t)} - f_{n,m}|^2 \to_t^\infty 0$$

where $\{f_{n,m}\}$ are the coefficients of $f(z', t)$. From this, we obtain that, $$\alpha_m - \sum_{n>0} f_{n,m}^{(t)} T_n(z_F) = f_{0,m}^{(t)} \to_t^\infty f_{0,m}$$
$$f_{n,m}^{(t)} \to_t^\infty f_{n,m}, n > 0$$

which shows that the coefficient of $f(z, t)$ satisfy the constraint of Eq.(7) and therefore belongs to $\mathcal{L}^2$. Since this is true for all converging sequence in $\mathcal{L}^2$, we conclude that the latter is indeed closed in the norm topology.

Proof of Lemma 1:

We use the method of integrating factors and write, $$e^{D(\omega)z} \frac{\partial}{\partial z} \hat{g}_l(z, \omega) + e^{D(\omega)z} D(\omega) \hat{g}_l(z, \omega) = \frac{\partial}{\partial z}(e^{D(\omega)z} \hat{g}_l(z, \omega)) = e^{D(\omega)z} \delta(z)$$

integrating from $z_0 < 0$ to z gives, $$e^{D(\omega)z} \hat{g}_l(z,\omega) - e^{D(\omega)z_0} \hat{g}_l(z_0,\omega) = H(z)$$

where H(z) is the Heaviside function. Taking $\hat{g}_l(z, \omega) \equiv 0$ (no sources to the left of $z_0$ for all time) implies that, $$\hat{g}_l(z,\omega) = e^{-D(\omega)z} H(z)$$

which is the desired result.

Proof of Lemma 2:

Consider a solution $\vec{A}^*(z, t)$ such that, $$\vec{A}^*(z,t) = P\phi(\vec{A}^*(z,t)) + \vec{A}^h(z,t) = \vec{\psi}(\vec{A}^*(z,t))$$

First, note that since P is a projection $\|P\| \leq 1$. Then consider another vector $\vec{A}(z, t)$ such that, $$\|\vec{A}(z, t) - \vec{A}^*(z, t)\| = \sum_l \|A_l(z, t) - A_l^*(z, t)\| < 1$$

Now consider:

$$\|\vec{\psi}(\vec{A}(z, t)) - \vec{\psi}(\vec{A}^*(z, t))\|^2$$
$$\|P\phi(\vec{A}(z, t)) - P\phi(\vec{A}^*(z, t))\|^2 =$$

$$\sum_l \int_z \int_t \left| \int \int \left( H(z - z') \int e^{i\omega(t-t')} e^{-D(\omega)(z-z')} d\omega \right) (N_l(z', t') - N_l^*(z', t')) dz' dt' \right|^2 dz dt \leq$$

$$\sum_l \int_z \int_t \left( 2W \int \int |N_l(z', t') - N_l^*(z', t')| dz' dt' \right)^2 dz dt \leq$$

$$16 LTW^2 \gamma^2 \left( \int \int \left| \sum_m |A_m(z, t)|^2 - |A_m^*(z, t)|^2 \right| dz' dt' \right)^2$$

after substitution of the explicit form for $N_l(\cdot)$.

Letting $$\delta A_m(z,t) = A_m(z,t) - A_m^*(z,t)$$

we can write, $$|A_m(z,t)|^2 - |A_m^*(z,t)|^2 = |\delta A_m(z,t)|^2 - 2\delta A_m(z,t) A_m^*(z,t)$$

so that, $$\int \int \left| \sum_m |A_m(z, t)|^2 - |A_m^*(z, t)|^2 \right| dz dt \leq$$

$$2 \sum_m \int \int |\delta A_m(z, t) A_m^*(z, t)| dz dt + \sum_m \int \int |\delta A_m(z, t)|^2 dz dt \leq$$

$$2 \sum_m \|\delta A_m\| \|A_m^*\| + \sum_m \|\delta A_m\|$$

by Cauchy-Schwartz inequality and noting that, $$\sum_m \int \int |\delta A_m(z, t)|^2 dz dt = \sum_m \|\delta A_m(z, t)\|^2 \leq \sum_m \|\delta A_m(z, t)\|$$

since $\|\delta\vec{A}\|<1$ by assumption. Putting everything together gives:

$$\left\|P\phi(\vec{A}(z,t)) - P\phi(\vec{A}^*(z,t))\right\|^2 \leq 16LTW^2\gamma^2 t\left(2\sup_m\|A_m^*\| + 1\right)^2 \|\vec{A} - \vec{A}^*\|^2$$

This shows that if, $$C = 16LTW^2\gamma^2 t\left(2\sup_m\|A_m^*\| + 1\right)^2 < 1$$

the operator $\vec{\psi}(\bullet)$ is a (local) contraction mapping, and an induction argument shows that, $$\|(\delta\vec{A}^{(k+1)}\| \leq C^k \|\delta\vec{A}^0\| \to_{k}^{\infty} 0$$

leading to the desired result.

Various embodiments of the FINSE technique can be used to pre-compensate data signals to be transmitted via a communication medium. With reference to FIG. 1, in a communication system 100 a data source 102 can generate or obtain the data symbols to be transmitted to a receiver 108 via a communication medium 106. The medium 106 can be an optical fiber or a similar dispersive medium that has one or more nonlinear properties affecting propagation of the data signals through the medium. The data signal can be derived from sources such as text, image, voice, and/or video data, data computed by a processor, and/or data derived from one or more sensors.

Before launching the data into the communication medium 106, the signal(s) obtained from the data source(s) are typically modulated using techniques such as amplitude, frequency, and phase modulation, and/or combinations thereof. In many embodiments, the communication medium supports simultaneous transmission of two or more data symbols via corresponding channels or modes. The carrier signals used for modulation of the data signals to be transmitted via different channels are generally different, and techniques such as frequency-division multiplexing, wavelength-division multiplexing, code-division multiplexing, etc., can be applied to a group of commonly modulated data signals.

After the optional but commonly performed modulation thereof, the data signals to be launched into the communication medium 106 are received at a pre-compensator 104. For convenience of illustration, FIG. 1 depicts two data channels, and the data source 102 transmits a data sequence D1[ ] and another data sequence D2[ ] to the pre-compensator 104. Some embodiments may include only one channel and many embodiments may have more than two, e.g., 5, 10, 32, 100, or even more channels. For the sake of convenience, the following discussion considers one data symbol $D_1$ for channel $C_1$ and one data symbol $D_2$ for channel $C_2$. In general, however, from each channel several data symbols from the respective data sequence are successively received at the pre-compensator 104, and are pre-compensated as described herein.

A data symbol launched at a launch location at the launch time, denoted $(z_0, t_0)$, would propagate a distance L along the communication channel, and would be received at the receiver 108, at the location and at time denoted $(z_{N_z}, t_{N_t})$. Generally, the total time of propagation $T=L/c$, where c is the speed of light. The distance L from the launch location to the receiver 108 is discretized into $N_z$ location points corresponding to $N_t$ instances of time. These locations are denoted $(z_1, t_1); (z_2, t_2); \ldots (z_n, t_n)$; etc. The locations may be evenly distributed across the total distance L in some embodiments, and may not be evenly distributed in other embodiments. In general, various embodiments employ at least two points per wavelength $\lambda_l$ corresponding to a channel l, and the wavelength $\lambda_l$ is inversely proportional to the channel frequency $\omega_l$. Thus, in some embodiments the number of discrete locations and the corresponding number of time instances are given by: $N_z=N_t=2\times L/\lambda_{min}$, where $\lambda_{min}$ is the smallest wavelength across various channels. As an example, if $\lambda_{min}=1{,}000$ nm, and if L=1 km, $N_z=N_t=2\times 10^9$. For a distance of 100 km, $N_z=N_t=2\times 10^{11}$, or 100 times more. Depending on the selected distance L and the number of discrete points per wavelength, $N_z$ and $N_t$ can range from $10^6$ to $10^{15}$.

The pre-compensator 104 produces a pre-distorted signal $PD_1$ corresponding to the data symbol $D_1$ for channel $C_1$, and a pre-distorted signal $PD_2$ corresponding to the data symbol $D_2$ for channel $C_2$. This can be achieved by modulating the received data symbols $D_1$ and $D_2$ using their respective launch amplitude sets that are determined by the pre-compensator/modulator 104, to generate pre-compensated (also called pre-distorted signals) $PD_1$ and $PD_2$. The launch amplitudes of the signal $PD_1$ at the launch location $z_0$ can be described as $\vec{A}_1(0,t)$, $t\in[0, N_t]$. Similarly, the launch amplitudes of the signal $PD_2$ at the launch location $z_0$ can be described as $\underline{A}_2(0,t)$, $t\in[0, N_t]$. The pre-compensator determines $\vec{A}_1(0,t)$ and $\vec{A}_2(0,t)$ as described above, and also as described with reference to FIG. 2.

Referring still to FIG. 1, the pre-distorted, i.e., pre-compensated signals $PD_1$ and $PD_2$ are transmitted by the pre-compensator 104 via the communication medium 106, and would undergo some distortion and/or crosstalk interference as they propagate through the communication medium. Corresponding signals $RD_1$ and $RD_2$ would then be received at the receiver 108. As described herein, various embodiments of FINSE provide the necessary pre-distortion such that $RD_1$ approximates the signal $D_1$, and $RD_2$ approximates the signal $D_2$, thereby mitigating or even nullifying the effect of distortion and crosstalk occurred during signal propagation via the communication medium 106. As used herein, a received signal (also referred to as a received data symbol) approximates or resembles the original signal prior to pre-compensation thereof (i.e., the data symbol to be transmitted) means that a variation between the respective signal/data symbol profiles (described, for example, using amplitudes, frequencies, phase, shape of the signal envelope, etc.) of the received and original signals is less than a specified threshold, e.g., less than 20%, 15%, 8%, 5%, 1%, 0.5%, 0.02%, etc.

Figure 2:
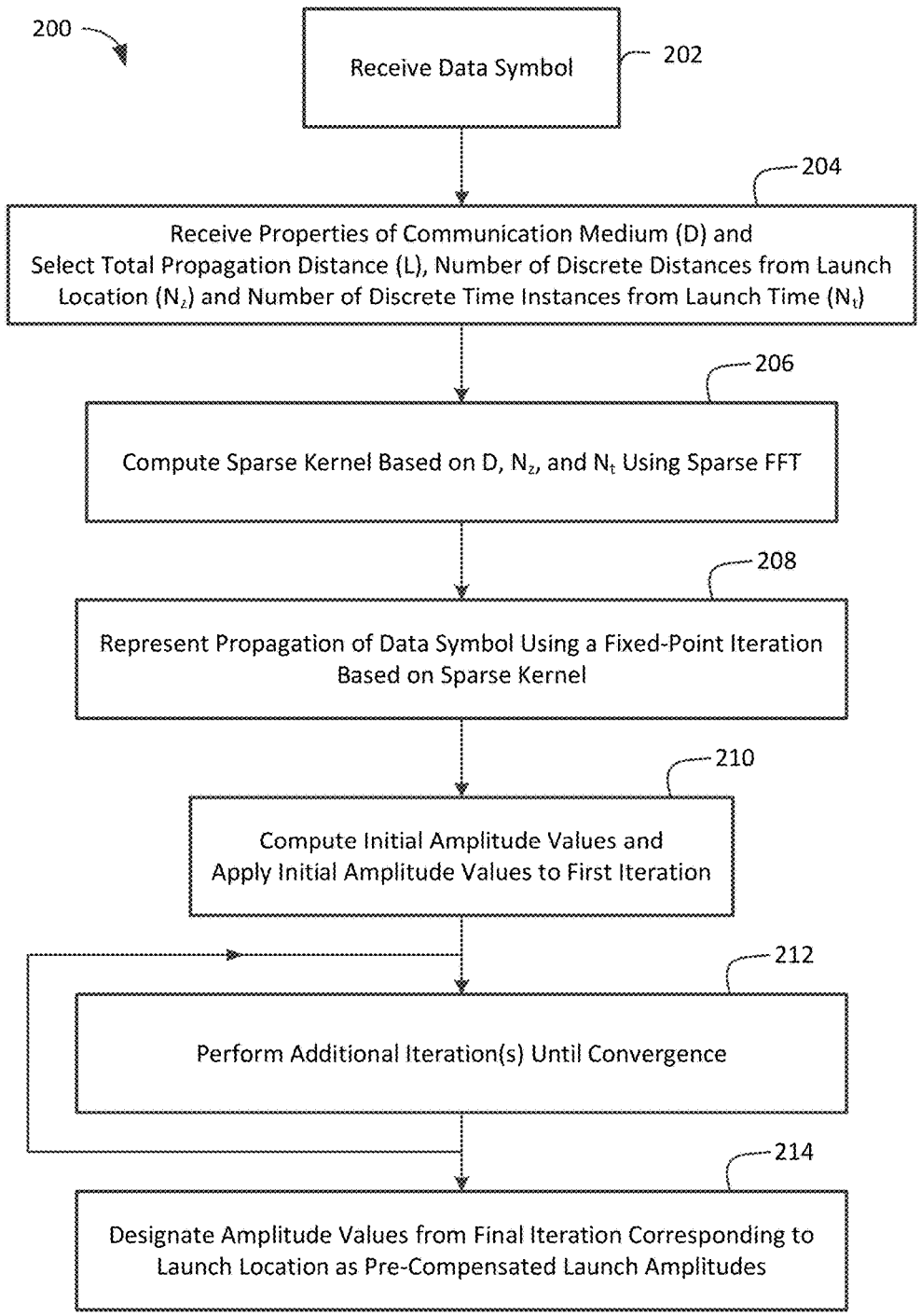
FIG. 2 depicts a process of pre-compensation, according to one embodiment.

With reference to FIG. 2, in a pre-compensation process 200, a data symbol having an original amplitude a is received at step 202. Properties of the communication medium, such as one or more attenuation coefficients, one or more group velocities, and/or one or more dispersion coefficients, are received at step 204. Based on these properties, a propagation distance L, the number of discrete distances or locations from the launch point, k, and the number of discrete time instances from the launch time, $N_t$, may be selected. In some embodiments, one or more of these parameters is selected independently of the medium properties. Using the properties of the communication medium, $N_z$, and $N_t$, a sparse kernel $\kappa(z-z', t-t')$ is computed using a sparse FFT, at step 206. The sparse FFT computation is based on Eqs. (3) and (10) discussed above.

At step 208, propagation of the data symbol through the communication medium is modeled as a fixed-point iteration, such as that described using Eqs. (5) and (8), and the iteration described in Lemma 2. A set of initial amplitude values for each mode/channel, denoted $\vec{A}^{(0)}$ (z, t), and that are based on the original amplitude a, are computed at step 210, e.g., using Eq. (9), and a first iteration is performed to obtain the amplitudes $\vec{A}^{(1)}$(z, t). In some embodiments, additional iterations are performed until convergence at step 212. A fixed-point iteration is determined to have converged when the result produced in an iteration is the same as or not substantially different from the result produced in a previous iteration. Not substantially different as used herein means within 10%, 5%, 1%, 0.2%, 0.1%, 0.05%, etc. of the result from the previous iteration. In some cases difference of up to 20%, 30%, or 50% may be tolerated. In some embodiments, a linear projector operator P is applied in each iteration to ensure that the boundary conditions specified using Eq. (2) are satisfied.

If convergence is reached at the iteration step K, the amplitude values $\vec{A}^{(K)}$(0, t) are designated at step 214 as the launch amplitude values at the location ($z_0$). These launch amplitude values represent the pre-compensated or pre-distorted data symbol corresponding to the original data symbol that was received in step 202. Typically, several data symbols, each corresponding to a different mode, may be received at step 202, and amplitude values $\vec{A}^{(K)}$(0, t) are computed using the process 200, for each mode l.

In some cases, the fixed-point iteration does not converge and, hence, it is terminated after a specified number of maximum iterations (e.g., 10, 50, 100, 250, 1000, etc.) is reached. At that time the values L, $N_z$, and/or $N_t$, that were computed in step 204 are readjusted (typically L is decreased), and the remaining steps of the process 200 may be repeated. In some cases, the total distance (L) between the transmitter and receiver, i.e., the length of the communication medium, is split into two or more legs, and each leg is analyzed sequentially according to the process 200. Thus, the need for repeaters during signal transmission over a long distance (e.g., a few hundreds of meters, a few kilometers, tens, hundreds, or thousands of kilometers, etc.) can be eliminated in some embodiments where the originally selected L corresponds to the distance between the first transmitter and the final receiver. The number of repeaters can be minimized in other embodiments, where the originally selected L must be decreased.

In summary, a computationally fast technique, called FINSE, is described for the solution of the nonlinear Schrödinger equation, with application to signal pre-compensation in the context of increasing the capacity and scaling of single and multi-mode communication media, such as fiber optics networks. Various embodiments of systems and methods for Fast Inversion for the Nonlinear Schrödinger Equation (FINSE) can increase the capacity and scaling of current dispersive communication systems, such as fiber optics networks, for communication over long distances through the development of fast algorithms, rendering recent advances in the field of pre-compensation of signals computationally feasible and practically implementable with little changes to the current infrastructure. This can have a direct impact in the ability to increase the performance of currently existing networks, decrease in the cost of building future networks, and extension of the distance between devices communicating directly through optical fibers such as in an underwater environment. Various embodiments described herein can perform signal pre-compensation orders-of-magnitude faster than the state-of-the-art, and can improve network availability and increase network capacity and scaling.

Unlike any generic operations such as data transmission and reception, unlike usual computer functions such as storage and access of information, and unlike any ordinary mathematical or mental processes such as comparing and categorizing information, the unconventional operations involved in FINSE, as described herein, are specifically orchestrated. Specifically, various embodiments of the FINSE methods and system involve analysis of the physical properties of a communication medium, and discretization of the propagation distance from a transmitter up to a receiver or a repeater is performed. Unlike conventional pre-compensation techniques, various FINSE embodiments take advantage of signal localization during propagation thereof, and identify a sparse kernel using sparse FFT. Conventional techniques do not perform a sparse FFT and do not use a sparse kernel. The sparse kernel is further used in fixed-point iterations, which are also not performed by the conventional techniques. These mathematical techniques are used to obtain a beneficial result in a different technology, the field of communication, specifically to determine launch amplitudes of signals.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for facilitating pre-compensation of a data signal to be transmitted via communication medium, the method comprising:
    receiving a data symbol corresponding to a transmission mode of the communication medium, the data symbol being represented at least in part by an original amplitude;
    determining a set of pre-compensated launch amplitudes for the data symbol, the set of pre-compensated launch amplitudes being based on, at least in part, the original amplitude and a nonlinear property of the communication medium, determination of the set of pre-compensated launch amplitudes comprising:
       computing using a sparse fast Fourier transform (sFFT) a sparse kernel having a set of values based on the nonlinear property of the communication medium, each value corresponding to a respective unique pair of distance and propagation time values along a selected distance of the communication medium;
       representing propagation of the data symbol through the communication medium over the specified distance as a fixed-point iterative computation based on: (i) the sparse kernel, and (ii) a set of amplitudes, each amplitude in the set corresponding to a respective unique pair of distance and propagation time values;
       determining based on the original amplitude an initial value for each amplitude in the set of amplitudes;
       iterating the fix-point iterative computation until an earlier of: (i) convergence of the iterative computation, and (ii) performance of a maximum permissible number of iterations, each iteration updating the values of amplitudes in the set of amplitudes from a previous iteration; and
       if the convergence is achieved, designating a subset of the updated amplitude values corresponding to distance value of zero the set of pre-compensated launch amplitudes, and otherwise reporting pre-compensation failure.

2. The method of claim 1, wherein:
    the communication medium comprises a multi-mode communication medium having a plurality of transmission modes, each transmission mode being associated with a respective transmission frequency;
    the receiving step comprises receiving a data symbol corresponding to each transmission mode; and
    the determining step comprises determining a set of pre-compensated launch amplitudes for each data symbol.

3. The method of claim 1, wherein the communication medium comprises an optical fiber.

4. The method of claim 1, wherein the nonlinear property of the communication medium is selected from the group consisting of an attenuation coefficient, a group velocity, and a dispersion coefficient.

5. The method of claim 1, wherein determining an initial value for each amplitude in the set of amplitudes comprises solving a signal propagation model of the communication medium by setting at least one nonlinear property of the communication medium in the model to zero.

6. The method of claim 1, wherein sparsity of the sparse kernel is proportional to a total number of propagation time values.

7. The method of claim 1, wherein iterating the fix-point iterative computation comprises applying a projection comprising updating the value of at least one amplitude in the set of amplitudes according to a boundary condition.

8. The method of claim 1, wherein at least one of:
the selected distance is within a range from 1 km up to 1,000 km; and
the number of distance and propagation time values is within a range from $10^8$ up to $10^{12}$.

9. The method of claim 1, further comprising transmitting via the communication medium a signal based on the set of pre-compensated launch amplitudes.

10. The method of claim 1, wherein when a pre-compensation failure is reported, determining the set of pre-compensated launch amplitudes further comprises decreasing the selected distance and repeating the step of determining the set of pre-compensated launch amplitudes using the decreased distance.

11. A system for facilitating pre-compensation of a data signal to be transmitted via communication medium, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, cause the processing unit to:
receive a data symbol corresponding to a transmission mode of the communication medium, the data symbol being represented at least in part by an original amplitude;
determine a set of pre-compensated launch amplitudes for the data symbol, the set of pre-compensated launch amplitudes being based on, at least in part, the original amplitude and a nonlinear property of the communication medium, wherein to determine of the set of pre-compensated launch amplitudes, the instructions cause the processing unit to:
compute using a sparse fast Fourier transform (sFFT) a sparse kernel having a set of values based on the nonlinear property of the communication medium, each value corresponding to a respective unique pair of distance and propagation time values along a selected distance of the communication medium;
represent propagation of the data symbol through the communication medium over the specified distance as a fixed-point iterative computation based on: (i) the sparse kernel, and (ii) a set of amplitudes, each amplitude in the set corresponding to a respective unique pair of distance and propagation time values;
determine based on the original amplitude an initial value for each amplitude in the set of amplitudes;
iterate the fix-point iterative computation until an earlier of: (i) convergence of the iterative computation, and (ii) performance of a maximum permissible number of iterations, and update in each iteration the values of amplitudes in the set of amplitudes from a previous iteration; and
if the convergence is achieved, designate a subset of the updated amplitude values corresponding to distance value of zero the set of pre-compensated launch amplitudes, and otherwise report pre-compensation failure.

12. The system of claim 11, wherein:
the communication medium comprises a multi-mode communication medium having a plurality of transmission modes, each transmission mode being associated with a respective transmission frequency; and
the instructions cause the processing unit to:
receive a data symbol corresponding to each transmission mode; and
determine a set of pre-compensated launch amplitudes for each data symbol.

13. The system of claim 11, wherein the communication medium comprises an optical fiber.

14. The system of claim 11, wherein the nonlinear property of the communication medium is selected from the group consisting of an attenuation coefficient, a group velocity, and a dispersion coefficient.

15. The system of claim 11, wherein to determine an initial value for each amplitude in the set of amplitudes, the instructions cause the processing unit to solve a signal propagation model of the communication medium by setting at least one nonlinear property of the communication medium in the model to zero.

16. The system of claim 11, wherein sparsity of the sparse kernel is proportional to a total number of propagation time values.

17. The system of claim 11, wherein to iterate the fix-point iterative computation, the instructions cause the processing unit to apply a projection comprising updating the value of at least one amplitude in the set of amplitudes according to a boundary condition.

18. The system of claim 11, wherein at least one of:
the selected distance is within a range from 1 km up to 1,000 km; and
the number of distance and propagation time values is within a range from $10^8$ up to $10^{12}$.

19. The system of claim 11, further comprising a modulator adapted to:
modulate the data symbol using the set of pre-compensated launch amplitudes; and
transmit via the modulated data symbol via the communication medium.

20. The system of claim 11, wherein when a pre-compensation failure is reported, for determining the set of pre-compensated launch amplitudes, the instructions further cause the processing unit to:
decrease the selected distance; and
repeating the operation of determining the set of pre-compensated launch amplitudes using the decreased distance.

* * * * *